A. M. Sawyer.
Grindstone.

N° 85,538. Patented Jan. 5, 1869.

Witnesses:
F. F. Fay
H. A. Fay

Inventor:
A. M. Sawyer

ADDISON M. SAWYER, OF ATHOL, MASSACHUSETTS.

*Letters Patent No. 85,538, dated January 5, 1869; antedated December 26, 1868.*

IMPROVEMENT IN POLISHING-WHEELS.

The Schedule referred to in these Letters Patent and making part of the same.

*To all whom it may concern:*

Be it known that I, ADDISON M. SAWYER, of Athol, in the county of Worcester, and State of Massachusetts, have invented a new Mode of Forming a Band or Surface for Buffing or Polishing; and I do hereby declare that the following is a full, clear, and exact description of the same, taken in connection with the accompanying drawings, making a part of this specification, in which—

Figure 1:
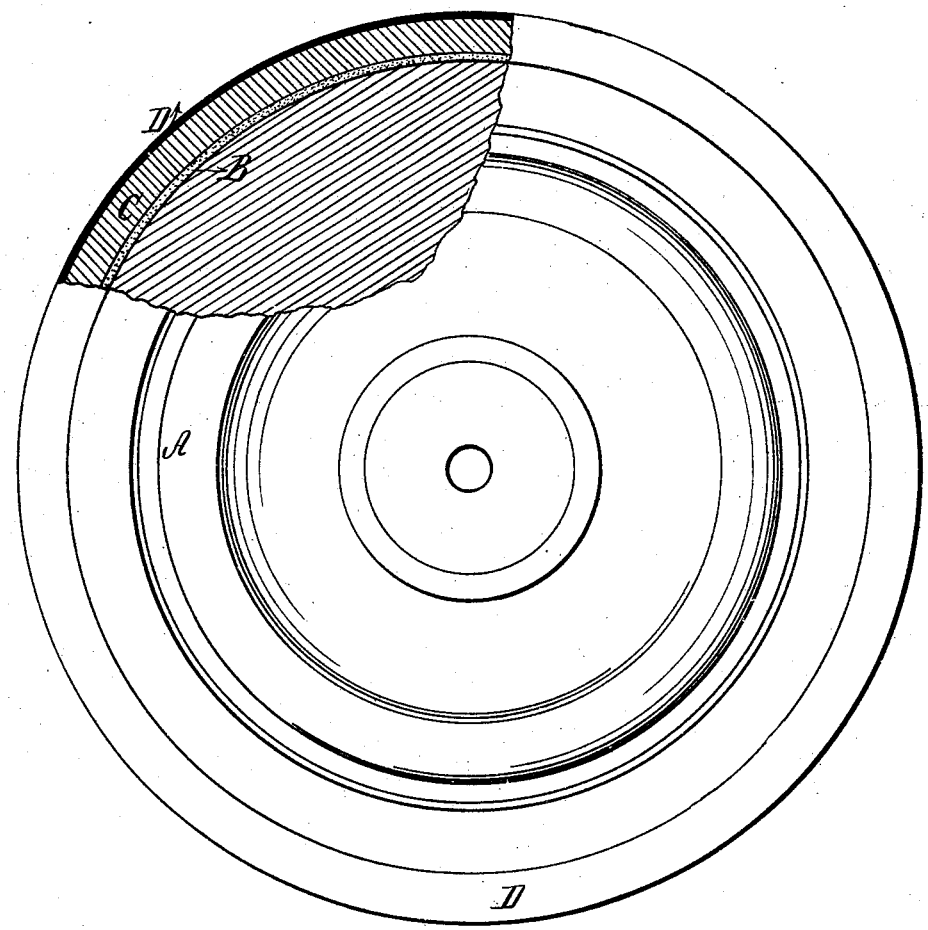
Figure 1 is a side elevation of a buffing-wheel, with a part in section.
Figure 2:
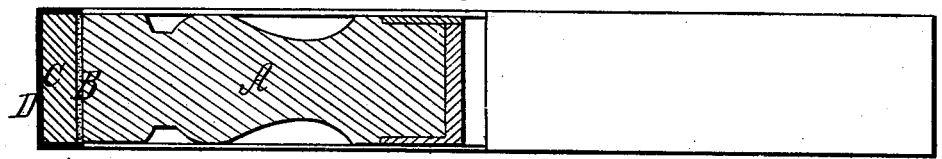
Figure 2 is an edge view of the same, half in section.

The subject-matter of my invention relates to a new mode of forming a band or surface for buffing, as it is called, for putting a high polish upon metals and other substances, and consists in forming the same of a layer or band of soft vulcanized rubber, to the outer surface of which is attached a covering, of buff leather or other suitable material, for holding the polishing-powder, and to the other surface of which is attached a strip of cloth, or other material which is practically inelastic in the direction of its length, to prevent the stretching of the rubber, the whole being united so as to form a permanent structure.

This article is designed more especially to be used for covering polishing-wheels, and the method in which it is made is as follows:

A strip of canvas, well stretched, of the proper length and width, is thoroughly coated with rubber cement upon one side, and wrapped around a former, slightly less in size than the wheel upon which the band is to be used, with the cemented side outward, and the ends joined by lapping them. Upon this is placed a strip of rubber, of a thickness proper to give the requisite elasticity to the buffing-surface, say about three-eighths of an inch, more or less. It is then placed in a mould and vulcanized, which gives it the exact form required; or it may be vulcanized without a mould, and afterwards placed upon a revolving mandrel or wheel that will fit it, and the outer surface ground off truly, upon the outside, to the shape required.

This surface is then covered with rubber cement, and allowed to dry until it is slightly sticky. A strip of buff leather, so called, or other material suitable to hold the polishing-powder, of the proper length and width, is prepared, by coating the back side with rubber cement in the same manner as before described with the rubber band. The strip is then laid with its cemented side upon the rubber, and pressed on to it in all parts, which causes it to adhere firmly.

After some further drying of the cement, the band is fit for use. In applying it to a wheel, or other implement, it is secured thereto by glue, or other adhesive material, which will adhere to the canvas and the surface of the implement. If it is not used upon a wheel or other implement, the canvas may be dispensed with, although I deem it preferable to use it.

In the drawings—

A is the wheel;

B, the canvas;

C, the rubber cushion; and

D, the buff-leather covering.

I do not herein claim the use of a canvas lining to the rubber band, to counteract its elasticity, as that is the subject of claim in another application for Letters Patent; but

What I claim, and desire to secure, is—

A polishing-surface composed of a cushion or band of soft vulcanized rubber, covered with buff leather, or other material that will hold the polishing-powder, substantially as described.

Executed, May 22, 1868.

A. M. SAWYER.

Witnesses:
F. F. FAY,
H. A. FAY.